United States Patent [19]

Bailey

[11] Patent Number: 5,070,129

[45] Date of Patent: Dec. 3, 1991

[54] POLYOLEFIN COMPOSITION CONTAINING FLUOROPOLYMER

[75] Inventor: Fay W. Bailey, Bartlesville, Okla.

[73] Assignee: Phillips Petroleum Company, Bartlesville, Okla.

[21] Appl. No.: 475,559

[22] Filed: Feb. 6, 1990

[51] Int. Cl.$^5$ ................................................ C08K 5/09
[52] U.S. Cl. ..................................... 524/399; 524/462; 524/546; 524/586; 524/587
[58] Field of Search ............... 524/399, 480, 487, 462, 524/546

[56] References Cited

U.S. PATENT DOCUMENTS 3,125,547  3/1964  Blatz .
4,694,027  9/1987  Park ........................................ 521/94
4,829,116  5/1989  Piesold ................................. 524/275

FOREIGN PATENT DOCUMENTS 0665886  7/1963  Canada ............................... 524/587

OTHER PUBLICATIONS

Plastic & Technology Article, "Lubricants and Processing Aids", 07/85, p. 82.
DuPont Viton Bulletins.

Primary Examiner—Joseph L. Schofer
Assistant Examiner—Mark Sweet
Attorney, Agent, or Firm—Carl D. Corvin

[57] ABSTRACT

An improved polyolefin composition, film product, and a method of preparation are provided. Fluoropolymers, preferably fluoroelastomers, and metal stearates, are added to polyolefins. The composition has and exhibits improved impact strength and better processability.

9 Claims, No Drawings

POLYOLEFIN COMPOSITION CONTAINING FLUOROPOLYMER

BACKGROUND OF THE INVENTION

The present invention relates to a polyolefin composition having improved processing properties. In another aspect, the present invention relates to improved polyolefin film.

Attempts to improve the processing properties of polyolefins in general, and polyethylene in particular is of common knowledge in the plastics industry. Such efforts have employed a variety of additives and methods.

In Blatz, (U.S. Pat. No. 3,125,547) it is disclosed that the addition of fluorocarbons to hydrocarbon polymers is beneficial. Park, (U.S. Pat. No. 4,694,027) discloses the addition of zinc stearate to HDPE. Lubricants and Processing Aids in Plastics Technology (7/85) teaches using fluoroelastomers as die lubricants in HDPE, but discourages using the combination of fluoroelastomers plus metal stearates.

SUMMARY OF THE INVENTION

It is a general object of this invention, to provide a new and improved polyolefin composition.

It is also an object of this invention to provide a new composition of polyethylene with improved properties and processability.

It is another object of this invention to provide a polyolefin composition containing at least one fluoroelastomer and at least one metal stearate in desirable quantities.

It is a further object of this invention to provide a superior polyolefin film.

In accordance with the present invention a polyolefin composition is provided comprising of about 0.001 to 0.5 weight percent of at least one fluoropolymer and 0.001 to 0.09 weight percent of at least one fatty acid salt.

In another embodiment of the invention improved polyolefin film is provided.

DETAILED DESCRIPTION OF THE INVENTION

Contrary to the disclosure and/or educated expectations therefrom of the Plastics Technology article, it is a discovery of this invention that the addition of a fluoroelastomer and metal stearate to polyolefins is not undesirable. Indeed, such an addition exhibits a synergistic effect on the dart impact strength of the HDPE polyolefin.

The ingredients needed to carry out this invention are polyolefins, fluoropolymers, fatty acids, and other conventional processing aids such as antioxidants.

All polyolefins such as polypropylene, polymethyl pentene, polymethyl butene, and especially polyethylene are suitable for this invention. Such polyolefins may be low, medium, or high density polyolefins. Preferred, however, are ethylene homopolymers and ethylene/hexene copolymers. These homopolymers may be of the density of 0.96 (gm/cc) grams per cc. and above, and such copolymers may have densities of 0.88 to 0.96 gram per cc.

The most particularly preferred polyolefins are high density polyethylenes (HDPE). Such compounds have densities ranging from about 0.930 to 0.970 g/cc and can be prepared by any method known in the art. One such method is described in McDaniel et al., U.S. Pat. No. 4,364,839. Copolymers of ethylene and 0.4 to 1 weight percent of a $C_4$ to $C_{10}$ comonomer (most preferably hexene) are especially preferred. Stated in terms of density, copolymers of ethylene and a $C_4$ to $C_{10}$ comonomer having a density of 0.950 to 0.957 are especially preferred.

Fluoropolymers useful in this invention include but are not limited to polytetrafluoroethylene made and sold under the trademark "TEFLON" by DuPont, and polychlorotrifluoroethylene made and sold under the trademark "KEL-F" by 3M. Preferred, however, are fluoroelastomers. The preferred fluoroelastomers are copolymers of vinylidene fluoride and hexafluoropropylene. Examples of such fluoroelastomers are made and sold under the following trademarks; "VITON ® A" by DuPont, and "FLUOREL" or "DYNAMER" by 3M. DuPont's "VITON ® A", useful in this invention includes "VITON ® A" 35 low molecular weight, "VITON ® A" medium molecular weight, and "VITON ® HV" high molecular weight.

The fatty acid salts useful for this invention include but are not limited to metal salts of saturated and unsaturated fatty acids such as stearic acid, oleic acid and lauric acid. Preferred, however, are metal stearates such as sodium stearate, calcium stearate, potassium stearate and the like. Most particularly preferred is zinc stearate.

There are, at least, two general methods for carrying out this invention. The polyolefin used in either method can be in the fluff, powder, or pellet form. The general ranges of the fatty acid salt and of the fluoropolymer necessary to carry out this invention using either of the methods discussed below are as follows: metal salts of fatty acids or metal stearates is generally in the range of from about 0.001 to 0.09 weight percent with a preferred range of from about 0.01 to 0.08 weight percent, and a distinctly preferred range of 0.03 to 0.06 weight percent. The range of the fluoropolymer is generally in the range of from about 0.001 to 0.5 weight percent, preferably in the range of 0.01 to 0.20 weight percent, and most preferably in the range of 0.03 to 0.06 weight percent based on the total composition.

The first method can be termed a unitary process where the polyolefin, antioxidants, stabilizers, metal stearate, and fluoropolymer are put in the mixing section(s) of a film extruder and melted, mixed, and extruded all at once.

The second method can be termed a divisible process. With this process the starting polyolefin is typically virgin fluff polyolefin. To such polyolefin is generally added suitable quantities of primary, and/or secondary antioxidants, other conventional stabilizers, and metal stearate. Examples of antioxidants and stabilizers useful in this process include but are not necessarily limited to BHT (butylated hydroxyl toluene), DLTDP (dilauryl thiodipropionate) and Ultranox 626 (Bis(2,4-dit-butylphenyl) pentalgerythritol diphosphite). This mixture of polyolefin, stabilizers, antioxidants, and metal stearate is then thoroughly mixed by employing any method known in the art. The polyolefin mixture is then converted to pellets by employing any method known in the art. To these pellets is then added the fluoropolymer. The fluoropolymers useful in this invention can be in pellet, powdery, liquid, or in any manner convient for use. The polyolefin pellets after thorough blending with the fluoropolymer is then utilized for film making.

Samples of the film made by these processes is then evaluated for its dart impact strength, spencer impact strength, machine direction and traverse direction tear strength, and fish eye count, using specific ASTM testing procedures.

PROCESS EXAMPLE

In one particular embodiment of this invention, high density polyethylene (HDPE) fluff was used. To this HDPE fluff of about 100 lb, the following ingredients were added: BHT about 0.06 weight percent; DLTDP about 0.03 weight percent, and Ultranox 626 about 0.05 weight percent and zinc stearate about 0.05 weight percent. These ingredients were properly stirred and then fed into a pelletizing machine in order to make pellets.

To these pellets made was then added about 0.04 weight percent of DuPont's "VITON ® A" from a 2% masterbatch. The "VITON ® A" was added in pellet form. The HDPE pellets and "VITON ® A" pellets were thoroughly blended in readiness for film making. The processing conditions at the film making extruder were as follows: melt temperature 225° C., set temperature 221° C., line speed 87 ft/min, pressure 2300 psig, frost line height 14 inches, and blow up ratio of 4:1. A screen pack of 20 mesh was used.

It is expressly noted that the processing conditions recited in the preceeding paragraph are variable and will vary when this process is commercially applied. It is likewise noted that the pressure is rpm dependent, and that the rpm is generally in the range of 30 to 100.

The following examples are further intended to illustrate the scope of this invention.

EXAMPLES 1-5

A series of five high density polyethylene compounds were prepared under similar conditions for testing as film resins.

All five compounds used a high density polyethylene fluff D568 from Phillips Chemical Company, 0.9550 g/cc density, 0.06 MI and 7.3 HLMI (density, melt index, and (HLMI), high load melt index, were measured using standard ASTM specific methods) as the base. All were compounded using a one and one-half inch Davis Standard extruder and techniques well known to those skilled in the art. The compositions of the five compounds are given in Table I.

The compounds above were each converted into blown film using a two-inch Sano blown film die with the one and one-half inch Davis Standard extruder and techniques well known to those skilled in the art. A Davis Standard screw speed of 30 rpm was used on each of the compounds and all other processing conditions were similar for all five compounds. The resulting films were each tested using standard ASTM methods. The results of these tests are shown in Table I.

TABLE I

| | Film Compositions and Properties (a) | | | | |
|---|---|---|---|---|---|
| | Resin 1 | Resin 2 | Resin 3 | Resin 4 | Resin 5 |
| Polyethylene | 99.86 | 99.81 | 97.86 | 97.81 | 97.76 |
| BHT (b) | 0.06 | 0.06 | 0.06 | 0.06 | 0.06 |
| DLTDP (c) | 0.03 | 0.03 | 0.03 | 0.03 | 0.03 |
| Ultranox 626 (d) | 0.05 | 0.05 | 0.05 | 0.05 | 0.05 |
| "Viton ® A" 2% MB (e) | 0.00 | 0.00 | 2.00 | 2.00 | 2.00 |
| Zinc Stearate | 0.00 | 0.05 | 0.00 | 0.05 | 0.10 |
| Dart Impact, g | 140 | 150 | 160 | 190 | 170 |

TABLE I-continued

| | Film Compositions and Properties (a) | | | | |
|---|---|---|---|---|---|
| | Resin 1 | Resin 2 | Resin 3 | Resin 4 | Resin 5 |
| Spencer, joule | 0.29 | 0.36 | 0.37 | 0.43 | 0.35 |
| Tear, g | | | | | |
| MD (f) | 19 | 19 | 16 | 16 | 14 |
| TD (g) | 110 | 120 | 200 | 190 | 160 |

(a) Composition values in Table I are in weight percent.
(b) A hydroxytoluene antioxidant well known to those skilled in the art.
(c) Dilaurylthiodipropionate, a stabilizer for polyethylene well known to those skilled in the art.
(d) A stabilizer for polyethylene well known to those skilled in the art.
(e) MB means masterbatch. A 2 weight percent "masterbatch" of the "VITON ® A" in polyethylene film resin was prepared using techniques and equipment well known to those skilled in the art. In making the compounds listed in Table I this masterbatch was added to the indicated compounds at the 2.00 weight percent level, resulting in a compound containing 0.04 weight percent of the "VITON ® A". "VITON ® A" is made by DuPont.
(f) MD means "machine direction,".
(g) TD means "transverse direction,".
(h) For the purpose of this invention, melt index, density, and high load melt index (HLMI) were measured by the following respective testing procedures ASTM Nos. D1238, D1505, and D1238.

Referring now to the data in Table 1, it can be seen that the presence of 0.05 weight percent zinc stearate in Resin 2 enhances the dart impact strength compared to Resin 1 (no zinc stearate) by 10 grams. Likewise, the presence of 0.04 weight percent fluoroelastomer ("VITON ® A") in Resin 3 enhances the dart impact strength compared to Resin 1 (no fluoroelastomer) by 20 grams. However, when both 0.05 weight percent zinc stearate and 0.04 weight percent fluoroelastomer are present (Resin 4), dart impact strength is surprisingly and unexpectedly increased by 50 grams compared to Resin 1, far more than the 30 gram sum of the effects of each of the two additives used alone. Additionally, the fact that Resin 5, containing twice the zinc stearate of Resin 4, exhibits a reduced dart impact strength compared with that of Resin 4 indicates that there is an optimum level of zinc stearate for a given level of fluoroelastomer.

While this invention has been described in detail for the purpose of illustration, it is not to be construed as limited thereby but is intended to cover all changes and modifications within the spirit and scope thereof.

That which is claimed is:

1. A polyolefin composition comprising:
   (a) a polymer selected from the group consisting of an ethylene/hexene copolymer having a density within the range of 0.95 to 0.957 gm/cc and high density ethylene homopolymer;
   (b) about 0.001 to 0.5 weight percent of a copolymer of vinylidene fluoride and hexafluoropropylene; and
   (c) about 0.001 to 0.09 weight percent of at least one fatty acid salt based on the weight of the total composition.

2. A composition as in claim 1 wherein said polyolefin is a high density ethylene homopolymer.

3. A composition as in claim 1 wherein said fatty acid salt is a metal stearate.

4. The composition as in claim 3 wherein said metal stearate is zinc stearate.

5. The composition of claim 1 in film form.

6. A polyolefin composition according to claim 1 wherein
   said polymer is said ethylene/hexene copolymer having a density within the range of 0.95 to 0.957 gm/cc;

said fluoropolymer is present in the amount of about 0.5 weight percent and comprises a copolymer of vinylidiene fluoride and hexafluoropropylene; and
said fatty acid salt is present in the amount of 0.03 to 0.06 weight percent and comprises zinc stearate.

7. A composition of claim 6 in film form.

8. A polyolefin composition comprising:
(a) a high density ethylene polymer;
(b) about 0.001 to 0.5 weight percent of a copolymer of vinylidene fluoride and hexafluoropropylene; and
(c) about 0.001 to 0.09 weight percent of at least one fatty acid salt based on the weight of the total composition.

9. A composition according to claim 6 wherein said high density ethylene polymer is an ethylene/hexene copolymer.

* * * * *